United States Patent [19]
Suda

[11] Patent Number: 4,768,867
[45] Date of Patent: Sep. 6, 1988

[54] ASPHERICAL SINGLE LENS
[75] Inventor: Shigeyuki Suda, Machida, Japan
[73] Assignee: Canon Kabushiki Kaisha, Tokyo, Japan
[21] Appl. No.: 901,414
[22] Filed: Aug. 28, 1986
[30] Foreign Application Priority Data
  Sep. 2, 1985 [JP] Japan .................. 60-194588
  Sep. 2, 1985 [JP] Japan .................. 60-194589
[51] Int. Cl.$^4$ ............................ G02B 13/08
[52] U.S. Cl. ................................. 350/432
[58] Field of Search ................. 350/432–435
[56] References Cited
U.S. PATENT DOCUMENTS
  4,027,952  6/1977  Hugues ................ 350/432
  4,415,238 11/1983  Braat et al. .......... 350/432
  4,449,792  5/1984  Arai et al. ........... 350/432
  4,571,034  2/1986  Nakamura ............ 350/432
  4,657,352  4/1987  Suda et al. .......... 350/432
  4,668,056  5/1987  Braat et al. .......... 350/432

FOREIGN PATENT DOCUMENTS
  3220408 12/1983 Fed. Rep. of Germany .
  58-68711  4/1983 Japan .
  60-120310 6/1985 Japan .

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

An aspherical single lens has a first surface having a radius of curvature r in the vicinity of the optic axis which lies on the objective side, and a second surface having a radius of curvature $r_2$ in the vicinity of the optic axis which lies on the image side. The first surface and the second surface both have an aspherical shape in which the radius of curvature becomes gradually greater from the center to the marginal portion. The lens satisfies the following conditions:

$$-0.25 < \beta < -0.15 \qquad (1)$$

$$-0.5 < r_1/r_2 < -0.15 \qquad (2)$$

where $\beta$ is the imaging magnification of the lens.

6 Claims, 6 Drawing Sheets

ASPHERICAL SINGLE LENS

BACKGROUND OF THE INVENTION

1. Field of the Invention

This invention relates to an imaging optical system used in the optical head of an optical memory device such as a video and audio disk, an optical disk or an optical card, and in particular to a both-surface aspherical single lens which has an imaging magnification of $-1/4$ to $-1/6$ whose NA is of the order of 0.45, and in which correction of abberations has been made over a relatively wide field of view. Particularly, in the both-surface aspherical single lens according to the present invention, correction of aberrations is made over a wide field of view and therefore, an imaging optical system can be constituted by a single lens and thus, this invention relates to a lens element suitable for the compact optical system of an optical head forming a finite imaging system.

2. Related Background Art

A finite imaging optical system in which a collimator lens and an objective are made integral for the purpose of reducing the cost of the imaging optical system for an optical memory and which is used at an imaging magnification $-1/4.33$ is disclosed in Japanese Laid-Open Patent Application No. 26917/1985. The optical system disclosed therein is a lens system comprising four groups of four lenses, and has an advantage that the number of lens barrels can be one for a lens construction usually comprised of a group of two collimator lenses and three groups of three objectives. However, in this lens construction, as compared with the usual lens construction, the number of lenses has only been reduced by one and a sufficient reduction in cost could not be achieved.

On the other hand, single lenses having both surfaces made aspherical as objectives for optical memories are disclosed in U.S. Pat. No. 4,027,952, U.S. Pat. No. 4,449,792, Japanese Laid-Open Patent Application No. 201210/1982, Japanese Laid-Open Patent Application No. 68711/1983, U.S. Pat. No. 4,571,034 and Japanese Laid-Open Patent Application No. 120310/1985. These both-surface aspherical single lenses only have an imaging magnification of $-1/17.7$ at greatest, and when the lenses of this type are used at an imaging magnification of $-1/4$ to $-1/6$ and at a numerical aperture (NA) of the order of 0.45, the imaging performance thereof deteriorates remarkably. Further, U.S. Pat. No. 4,449,792, Japanese Laid-Open Patent Application No. 201210/1982, Japanese Laid-Open Patent Application No. 68711/1983, U.S. Pat. No. 4,571,034 and Japanese Laid-Open Patent Application No. 120310/1985 pay attention chiefly to spherical aberration and coma and are designed to make a near-axis aberration correction of the order of 0.1–0.2 mm$\phi$ on the disk surface. That is, any of these are designed to be used with a collimator lens and thus, these documents relate to a system whereby the objectives are moved in parallel as a unit in a parallel light beam during the tracking, and the abberation of only a minute area near the axis need be corrected. However, in a finite imaging system having an imaging magnification of the order of $-1/4$ to $-1/6$, the parallel movement of the lenses during the tracking results in great off-axis imaging for the lenses and therefore, as compared with the conventional infinity imaging system, it is necessary to design the range of aberration correction of the lens itself widely. That is, an imaging performance approximate to the diffraction limit becomes necessary over the order of 0.4 to 0.5 mm$\phi$ on the disk surface, and correction of astigmatism becomes requisite in addition to correction of spherical aberration and coma. In the aforementioned U.S. Pat. No. 4,027,952, description is made of the correcting conditions under which astigmatism and curvature of the image field become equal to zero, and two examples of a pickup lens of a meniscus shape used at an imaging magnification of $-1/17.7$ to $-1/20.2$ are disclosed as embodiments. However, these lenses have their focal length designed to be of the order of 7.5 mm, and have a disadvantage that if the focal length is of the orders of 4–5 mm to make the lenses compact, a sufficient working distance cannot be obtained because the second surface in particular is concave relative to the disk surface.

SUMMARY OF THE INVENTION

In view of the above-noted problems, it is an object of the present invention to provide an aspherical single lens which has an imaging magnification of the order of $-1/4$ to $-1/6$ and a focal length of the order of 4 to 5 mm and which can secure a desired working distance and a desired imaging performance and can achieve aberration correction over a wide field of view.

To achieve the above object, the aspherical single lens according to the present invention is a lens used at a reduction magnification and characterized in that it is designed such that both surfaces thereof have an aspherical shape in which the radius of curvature becomes gradually greater from the center to the marginal portion and such that it satisfies the following conditions:

$$-0.25 < \beta < -0.15 \quad (1)$$

$$-0.5 < r_1/r_2 < -0.15 \quad (2)$$

where $r_1$ is the radius of curvature in the vicinity of the optic axis of a first surface which is adjacent to the object side, $r_2$ is the radius of curvature in the vicinity of the optic axis of a second surface which is adjacent to the image side, and $\beta$ is the imaging magnification of the lens, and under such conditions, that parameters $\beta$, $r_1$ and $r_2$ and the thickness d, the refractive index n and the focal length f of the lens are set, whereby aberration correction is effected over a wide field of view.

Various aspherical single lenses which satisfy the above conditions exist and can be suitably designed in conformity with the specification, but to obtain a lens suitable as an imaging optical system for an optical memory, it is preferable to design the lens so as to satisfy the following conditions (3) and (4) or (5), (6) and (7) at the same time in addition to the above-mentioned conditions:

$$1.1 < (n-1)\left(\frac{1}{r_1} - \frac{1}{r_2}\right)f < 1.3 \quad (3)$$

$$1.2 < d/f < 1.4 \quad (4)$$

$$-0.45 < r_1/r_2 < -0.35 \quad (5)$$

$$1.3 < d/r_1 < 1.5 \quad (6)$$

$$1.2 < d/f < 1.3 \quad (7)$$

By the above conditions being satisfied, correction of spherical aberration, coma and astigmatism can be achieved while a desired working distance is secured.

In the present invention, it is desirable to design the optical system such that as the requisite construction of an optical memory device such as an optical disk or an optical card, an optical path dividing prism member of the order of 5–10 mm is disposed on the light source side and an optical medium consisting of information surface protecting glass or plastic of the order of 1–1.5 mm is disposed on the disk side.

DESCRIPTION OF THE PREFERRED EMBODIMENTS

Before an embodiment of the present invention is described, the aforementioned conditions will be described.

First, formula (1) shows an imaging magnification suitable for an aspherical single lens according to the present invention. This shows the specification of an imaging system to which the present invention is applied and in which the NA necessary to read the information density of an optical disk is supposed to be of the order of 0.45–0.50, and a semiconductor laser is used as a light source, and an NA of 0.075–0.125 covering the angle of light emission thereof is the subject. That is, if the lower limit of formula (1) is exceeded, (i) the pupil diameter for the focal length will become great and therefore great high-order spherical aberration and astigmatism will occur and aberration correction by a single lens will become difficult, (ii) the aberration correction will be affected by the astigmatism of the semiconductor laser LD itself, and (iii) the NA of the light source side will become great and therefore the influence of the angle of light emission of the semiconductor laser LD being not isotropic will become great and as a result, the shape of the spot on the surface of the disk will become an ellipse. If the upper limit of formula (1) is exceeded, (i) the coupling efficiency of the semiconductor laser will be reduced and the energy on the surface of the disk and the light-receiving surface will be reduced, thus resulting in a reduced S/N, and (ii) the distance between the light source and the disk will become long and thus, the system will become bulky.

Formula (2) shows the curvature ratio in the vicinity of the optic axis between the first surface and the second surface. If the lower limit of formula (2) is exceeded, astigmatism will chiefly increase, and if the upper limit of formula (2) is exceeded, it will become difficult to obtain a desired working distance.

As described previously, each surface is formed by an aspherical surface whose radius of curvature becomes gradually greater from the center to the marginal portion so as to satisfy, conditions (1) and (2), thereby providing a biconvex aspherical lens, and by setting the thickness d, the refractive index n, the imaging magnification $\beta$, the focal length f and the radii of curvature $r_1$ and $r_2$ of the lens in conformity with the specification, not only spherical aberration and coma but also astigmatism can be corrected, and even if the system is made compact, a sufficient working distance can be secured. Accordingly, the single pickup lens of a finite imaging system having a good imaging performance can also be easily designed.

Formulas (3)–(7) are formulas showing two examples of the preferable condition for eliminating spherical aberration, coma and astigmatism by satisfying formulas (3) and (4) or (5) to (7) at the same time, and thereby obtaining the working distance necessary for the system. Assuming that each of the other formulas is satisfied, each formula will hereinafter be described.

Formula (3) shows the curvature ratio in the vicinity of the optic axis between the first surface and the second surface, the relation between the refractive index and the focal length of the lens, and the power arrangement of the first and second surfaces. If the lower limit of formula (3) is exceeded, the curvature of the first surface will become great and it will become difficult to obtain a desired working distance, and if the upper limit of formula (3) is exceeded, correction of astigmatism will again become difficult. Further, formula (4) shows the relation between the thickness and the focal length of the lens. If the lower limit of this formula is exceeded, astigmatism will again remarkably occur to the under, and if the upper limit of this formula is exceeded, astigmatism will become over and it will become difficult to secure the working distance. The aspherical shape corrects in a well balanced fashion the sperical aberration generally remarkably occurring to the under and therefore, it can be designed in a shape in which the radius of curvature becomes gradually greater from the center to the marginal portion as previously described.

On the other hand, formula (5) further restricts the range of formula (2) in conformity with the conditions of formulas (6) and (7) which will be described later. If the lower limit of this formula is exceeded, astigmatism will chiefly occur to the under, and if the upper limit of this formula is exceeded, it will become difficult to obtain a desired working distance particularly when the focal length of the lens is shortened for the compactness of the system. Formula (6) shows the relation between the radius of curvature $r_1$ of the first surface in the vicinity of the optic axis and the thickness d of the lens, and also shows the power arrangement of the first and second surfaces after the refractive index and the focal length of the lens have been determined. That is, if the lower limit of formula (6) is exceeded, astigmatism will occur to the under, and if the upper limit of this formula is exceeded, astigmatism will become over. Further, formula (7) is concerned with the thickness d and the focal length f. If the lower limit of this formula is exceeded, astigmatism will again occur to the under, and if the upper limit of this formula is exceeded, it will become difficult to obtain a desired working distance. Spherical aberration and coma can be eliminated by optimally selecting the aspherical shape after formulas (1), (2), (5), (6) and (7) have been satisfied. The aspherical shape well-balancedly corrects the spherical aberration generally remarkably occurring to the under and therefore, it can be designed in a shape in which the radius of curvature becomes gradually greater from the center to the marginal portion as previously described.

A specific embodiment of the present invention will hereinafter be described.

Figure 1:
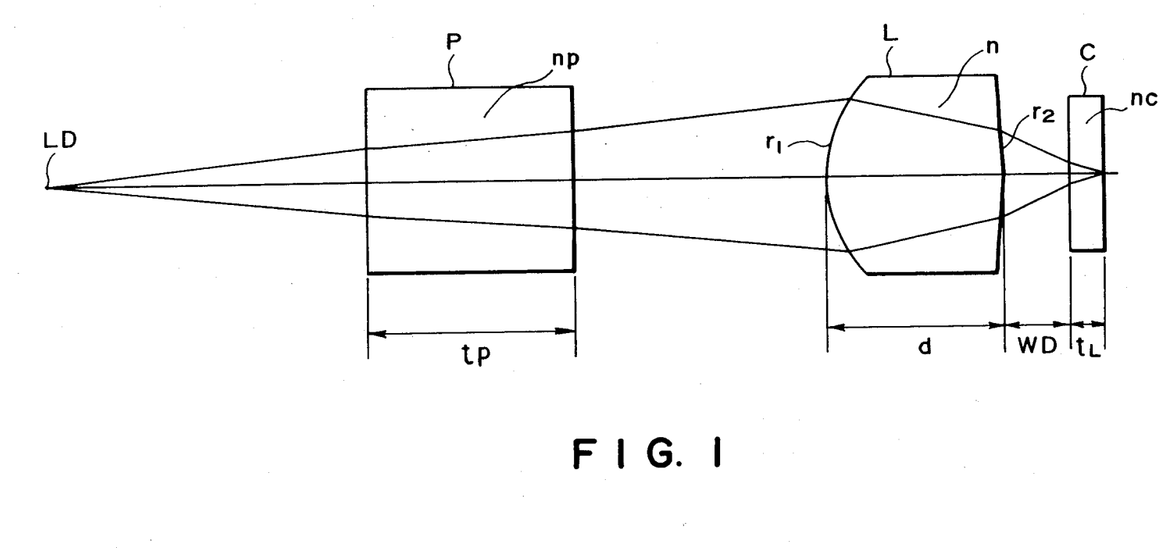
FIG. 1 shows an optical path when the aspherical single lens according to the present invention is disposed in the optical system of an optical disk.
Figure 2:
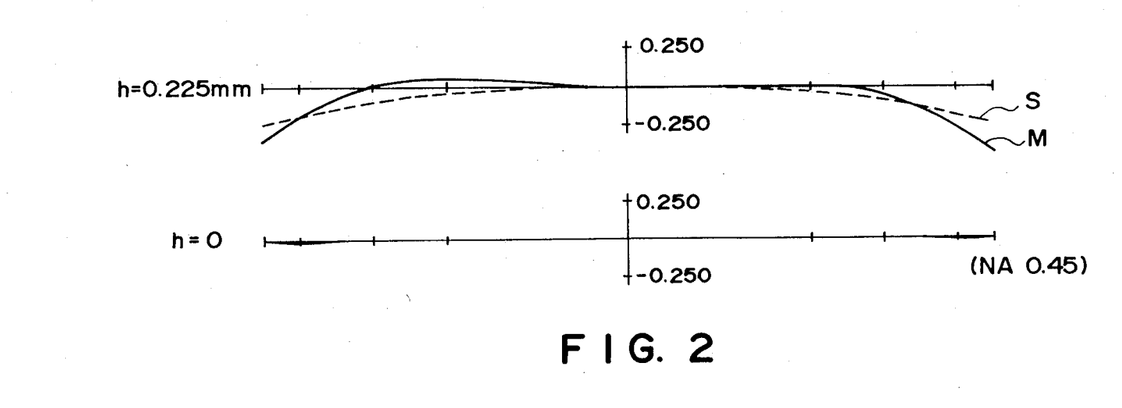
FIGS. 2 to 6 show the wave surface aberrations of first to fifth embodiments, respectively, of the present invention on the axis and at an image height of 0.225 mm on the paraxial image plane.
Figure 3:
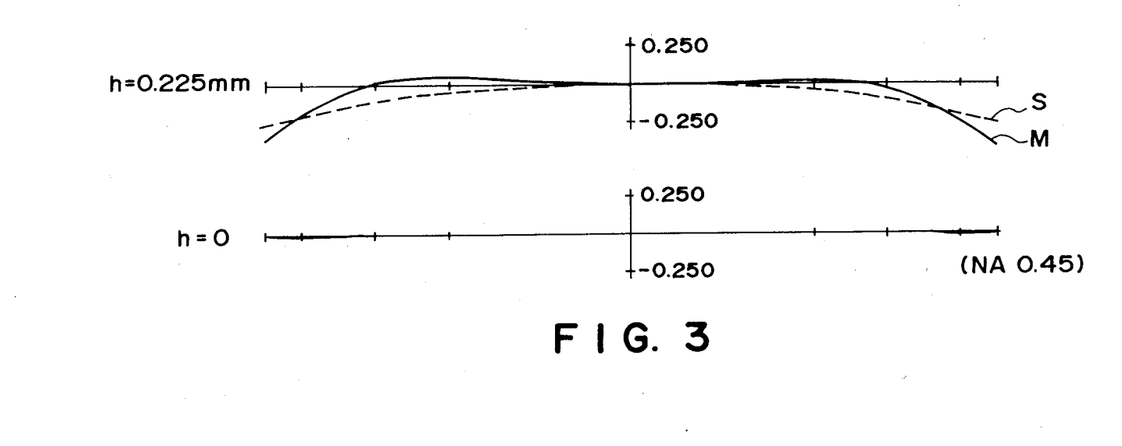
Figure 4:
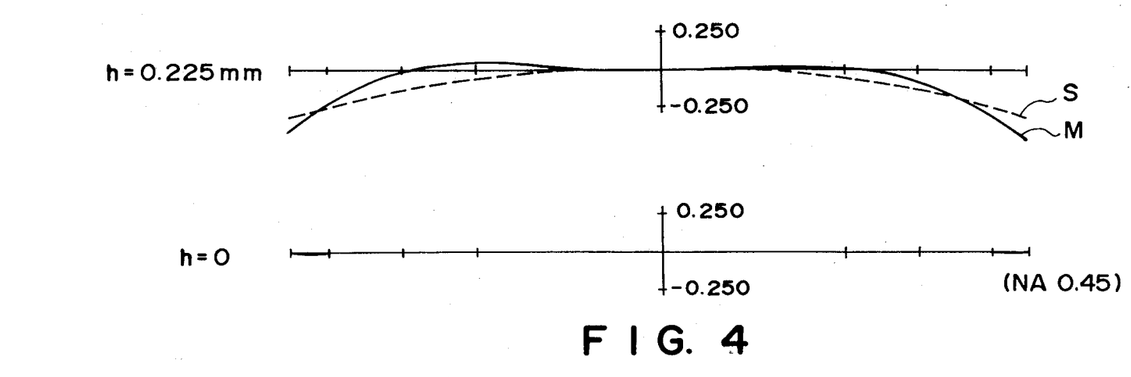
Figure 5:
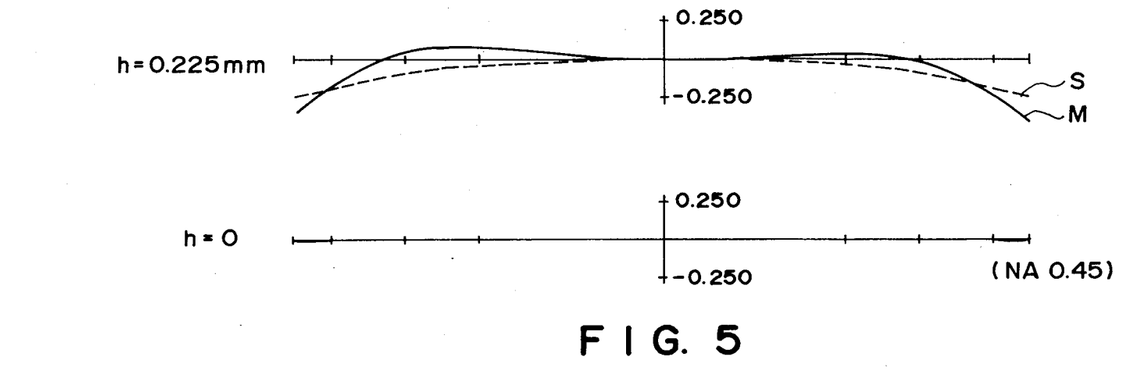
Figure 6:
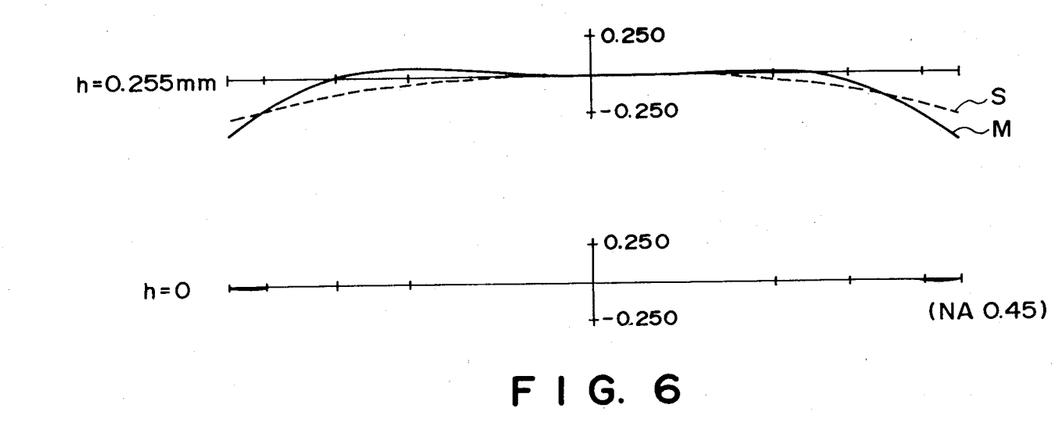

FIG. 1 shows a first embodiment of the aspherical single lens according to the present invention, and particularly shows the optical path thereof when it is disposed in the optical system of an optical disk. FIG. 2 shows the wave surface aberrations on the axis and at the image height 0.225 of the paraxial image plane in the first embodiment. In FIG. 1, L designates a both-surface aspherical single lens according to the present invention, C denotes an information surface protecting medium, P designates an optical path dividing prism, $r_1$ represents the radius of curvature of the first surface of the lens L in the vicinity of the optic axis, $r_2$ represents the radius of curvature of the second surface of the lens L in the vicinity of the optic axis, d represents the thickness of the lens L, $\eta$ represents the refractive index of the lens L for a wavelength $\lambda = 780$ nm, WD represents the working distance, $\eta_p$ represents the refractive index of the optical path dividing prism P, $t_p$ represents the thickness of the optical path dividing prism P, $\eta_c$ represents the thickness of the information surface protecting medium C, and LD represents the light ray emergence position of a semiconductor laser. The focal length of this aspherical single lens is represented by f, the numerical aperture thereof is represented by NA, and the imaging magnification thereof is represented by $\beta$. Also, in FIG. 2, h represents the image height, S represents the wave surface aberration in the sagittal direction, and M represents the wave surface aberration in the meridional direction.

The aspherical shape of the lens L is represented by the following equation (8) including the terms up to the tenth power of H or the rotation-symmetrical quadratic surface base when the vertex of each surface of the lens L is the origin and the optic axis is the X-axis and the incidence height is H. In equation (8), K is a cone constant, and B, C, D, E, A', B', C' and D' are the constants of respective degrees. (Hereinafter, K, B, C, D, E, A', B', C', and D' will be referred to as the asphericity coefficients.)

$$x = \frac{H^2/r}{\sqrt{1 + 1 - (1 + K)(H/r)^2}} + BH^4 + CH^6 + DH^8 + EH^{10} + A'|H|^3 + B'|H|^5 + C'|H|^7 + D'|H|^9 \quad (8)$$

The limitations of the degrees in the above equation are for convenience' sake and are not restrictive.

Table 1A and 1B below show the values of respective parameters (including the lens data) in the first embodiment shown in FIG. 1 and the values of the asphericity coefficients in equation (8). In table 1B, the suffixes 1 and 2 in the respective symbols correspond to the first surface and the second surface, respectively, of the lens L.

TABLE 1A

| | |
|---|---|
| f = 5.0 | $\beta = -1/4.43$ |
| $\gamma_1 = 4.18849$ | $\gamma_2 = -26.40660$ |
| d = 6.87 | n = 1.80338 |
| WD = 1.701 | NA = 0.45 |
| np = 1.51 | tp = 7.5 |
| nc = 1.2 | tc = 1.55 |

TABLE 1B

| | |
|---|---|
| $K_1 = -1.93697 \times 10^{-2}$ | $K_2 = -1.91631 \times 10^2$ |
| $B_1 = -8.6529 \times 10^{-4}$ | $B_2 = 9.29888 \times 10^{-3}$ |
| $C_1 = -3.17391 \times 10^{-5}$ | $C_2 = -2.67542 \times 10^{-4}$ |
| $D_1 = 1.65843 \times 10^{-8}$ | $D_2 = 7.29102 \times 10^{-6}$ |
| $E_1 = -1.7513 \times 10^{-7}$ | $E_2 = 3.06976 \times 10^{-5}$ |
| $A'_1 = 0$ | $A'_2 = 0$ |
| $B'_1 = 0$ | $B'_2 = 0$ |
| $C'_1 = 0$ | $C'_2 = 0$ |
| $D'_1 = 0$ | $D'_2 = 0$ |

As can be seen from Table 1A and the wave surface aberration graph of FIG. 2, the aspherical single lens according to the present embodiment satisfies the aforementioned formulas (1) to (4) and therefore, has a good imaging performance and a good working distance even when it is used at a focal length f = 5.0 mm and an imaging magnification $\beta = -1/4.43$. That is, it may be said that there is little or no on-axis wave surface aberration in the image plane, and the off-axis aberration also sufficiently satisfies the required performance, and therefore, a good imaging performance is maintained over a wide field of view.

Next, Tables 2A, 2B to 5A, 5B show the values of respective parameters including the lens data and the values of the asphericity coefficients in second to fifth embodiments of the aspherical single lens according to the present invention. FIGS. 3 to 6 show the respective wave surface aberrations in the second to fifth embodiments which, like the first embodiment, satisfy formulas (1) to (4) above. Accordingly, in these figures and tables, the symbols are similar in significance to those in the previous embodiment and the form of description is also similar.

TABLE 2A

| | |
|---|---|
| f = 5.0 | $\beta = -1/4.43$ |
| $\beta_1 = 4.20019$ | $\gamma_2 = -17.14889$ |
| d = 6.85 | n = 1.78569 |
| WD = 1.7666 | NA = 0.45 |
| np = 1.51 | tp = 7.5 |
| nc = 1.55 | tc = 1.2 |

TABLE 2B

| | |
|---|---|
| $K_1 = -2.03679 \times 10^{-2}$ | $K_2 = -6.23888 \times 10$ |
| $B_1 = -9.10026 \times 10^{-4}$ | $B_2 = 8.29197 \times 10^{-3}$ |
| $C_1 = -3.30378 \times 10^{-5}$ | $C_2 = -4.64709 \times 10^{-4}$ |
| $D_1 = 3.48365 \times 10^{-8}$ | $D_2 = 4.09613 \times 10^{-5}$ |
| $E_1 = -1.76414 \times 10^{-7}$ | $E_2 = 1.28071 \times 10^{-5}$ |
| $A'_1 = 0$ | $A'_2 = 0$ |
| $B'_1 = 0$ | $B'_2 = 0$ |
| $C'_1 = 0$ | $C'_2 = 0$ |
| $D'_1 = 0$ | $D'_2 = 0$ |

TABLE 3A

| | |
|---|---|
| F = 5.0 | $\beta = -1/4.43$ |
| $\gamma_1 = 4.51574$ | $\gamma_2 = -9.72194$ |
| d = 6.96 | n = 1.78569 |
| WD = 1.9637 | NA = 0.45 |
| np = 1.51 | tp = 7.5 |
| nc = 1.55 | tc = 1.2 |

TABLE 3B

| | |
|---|---|
| $K_1 = 5.62477 \times 10^{-3}$ | $K_2 = -3.64953 \times 10$ |
| $B_1 = -8.46485 \times 10^{-4}$ | $B_2 = 2.22050 \times 10^{-3}$ |
| $C_1 = -3.76769 \times 10^{-5}$ | $C_2 = -4.72534 \times 10^{-5}$ |
| $D_1 = -6.78326 \times 10^{-7}$ | $D_2 = -8.49785 \times 10^{-6}$ |
| $E_1 = -8.30861 \times 10^{-8}$ | $E_2 = 0$ |
| $A'_1 = -6.18972 \times 10^{-5}$ | $A'_2 = 0$ |
| $B'_1 = -3.80990 \times 10^{-5}$ | $B'_2 = 0$ |

TABLE 3B-continued

| | |
|---|---|
| $C'_1 = 6.68037 \times 10^{-6}$ | $C'_2 = 0$ |
| $D'_1 = -2.37867 \times 10^{-7}$ | $D'_2 = 0$ |

TABLE 4A

| | |
|---|---|
| f = 5.0 | $\beta = -\frac{1}{4}$ |
| $\gamma_1 = 4.19616$ | $\gamma_2 = -16.81808$ |
| d = 6.93209 | n = 1.78569 |
| WD = 1.84145 | NA = 0.45 |
| np = 1.51 | tp = 7.5 |
| nc = 1.55 | tc = 1.2 |

TABLE 4B

| | |
|---|---|
| $K_1 = -2.76616 \times 10^{-2}$ | $K_2 = -5.28127 \times 10$ |
| $B_1 = -9.32541 \times 10^{-4}$ | $B_2 = 8.47133 \times 10^{-3}$ |
| $C_1 = -3.3232 \times 10^{-5}$ | $C_2 = -4.40726 \times 10^{-4}$ |
| $D_1 = 1.87748 \times 10^{-7}$ | $D_2 = 5.36500 \times 10^{-5}$ |
| $E_1 = -1.80221 \times 10^{-7}$ | $E_2 = 1.12806 \times 10^{-5}$ |
| $A'_1 = 0$ | $A'_2 = 0$ |
| $B'_1 = 0$ | $B'_2 = 0$ |
| $C'_1 = 0$ | $C'_2 = 0$ |
| $D'_1 = 0$ | $D'_2 = 0$ |

TABLE 5A

| | |
|---|---|
| f = 5.0 | $\beta = -1/6$ |
| $\gamma_1 = 4.1864$ | $\gamma_2 = -18.43667$ |
| d = 6.76332 | n = 1.78569 |
| WD = 1.505 | NA = 0.45 |
| np = 1.51 | tp = 7.5 |
| nc = 1.55 | tc = 1.2 |

TABLE 5B

| | |
|---|---|
| $K_1 = -2.0895 \times 10^{-2}$ | $K_2 = -5.08178 \times 10$ |
| $B_1 = -8.27778 \times 10^{-4}$ | $B_2 = 9.81605 \times 10^{-3}$ |
| $C_1 = -3.28851 \times 10^{-5}$ | $C_2 = -8.05296 \times 10^{-4}$ |
| $D_1 = -3.8753 \times 10^{-8}$ | $D_2 = 2.93375 \times 10^{-5}$ |
| $E_1 = -1.79483 \times 10^{-7}$ | $E_2 = 2.48865 \times 10^{-5}$ |
| $A'_1 = 0$ | $A'_2 = 0$ |
| $B'_1 = 0$ | $B'_2 = 0$ |
| $C'_1 = 0$ | $C'_2 = 0$ |
| $D'_1 = 0$ | $D'_2 = 0$ |

As further embodiments of the aspherical single lens according to the present invention, sixth to tenth embodiments of the lens which satisfy the aforementioned formulas (1), (2), (5), (6) and (7) are shown in Tables 6A, 6B to 10A, 10B below and FIGS. 7 to 11. FIGS. 7 to 11, like FIG. 2, show the wave surface aberrations at an image height h=0.2 mm and an image height h=0 (on-axis).

Tables 6A and 6B below respectively show the values of the respective parameters (including the lens data) shown in FIG. 1 in the sixth embodiment and the values of the asphericity coefficients in equation (8). In Table 6B, the suffixes 1 and 2 in the symbols correspond to the first surface and the second surface, respectively, of the lens L.

TABLE 6A

| | |
|---|---|
| f = 4.2 | $\beta = -1/4.7$ |
| $\gamma_1 = 3.83518$ | $\gamma_2 = -9.53833$ |
| d = 5.2 | n = 1.78569 |
| WD = 1.81382 | NA = 0.45 |
| np = 1.51 | tp = 7.5 |
| nc = 1.55 | tc = 1.2 |

TABLE 6B

| | |
|---|---|
| $K_1 = 2.41036 \times 10^{-2}$ | $K_2 = -3.85045 \times 10$ |
| $B_1 = -1.38905 \times 10^{-3}$ | $B_2 = 2.4461 \times 10^{-3}$ |
| $C_1 = -8.40887 \times 10^{-5}$ | $C_2 = -1.23917 \times 10^{-4}$ |
| $D_1 = -2.75236 \times 10^{-6}$ | $D_2 = 0$ |
| $E_1 = -4.28058 \times 10^{-7}$ | $E_2 = 0$ |
| $A'_1 = -8.41466 \times 10^{-5}$ | $A'_2 = 0$ |
| $B'_1 = -9.39118 \times 10^{-5}$ | $B'_2 = 0$ |
| $C'_1 = 1.80627 \times 10^{-5}$ | $C'_2 = 0$ |
| $D'_1 = -6.76319 \times 10^{-7}$ | $D'_2 = 0$ |

Figure 7:
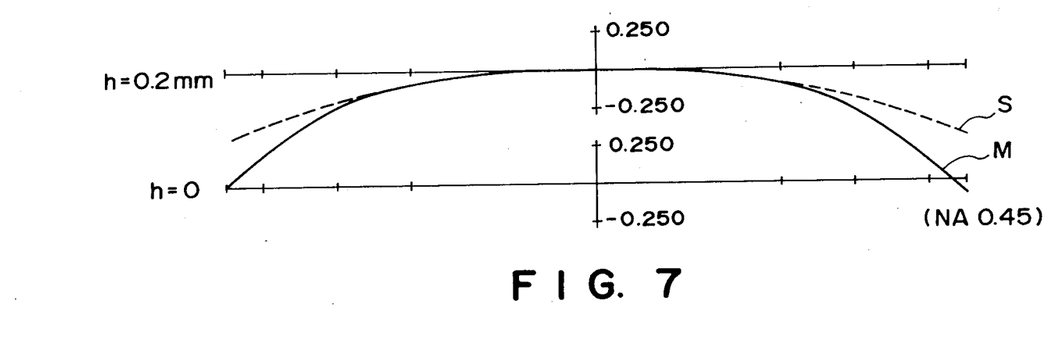
FIGS. 7 to 11 show the wave surface aberrations of sixth to tenth embodiments, respectively, of the present invention on the axis and at an image height 0.2 mm on the paraxial image plane.
Figure 8:
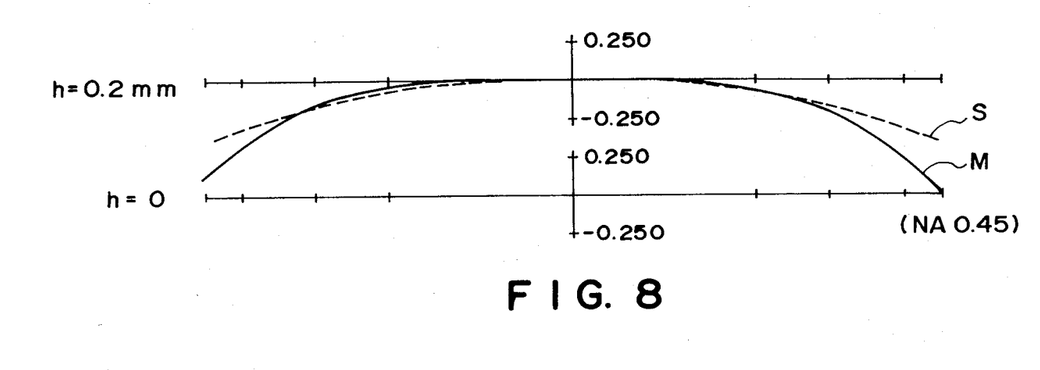
Figure 9:
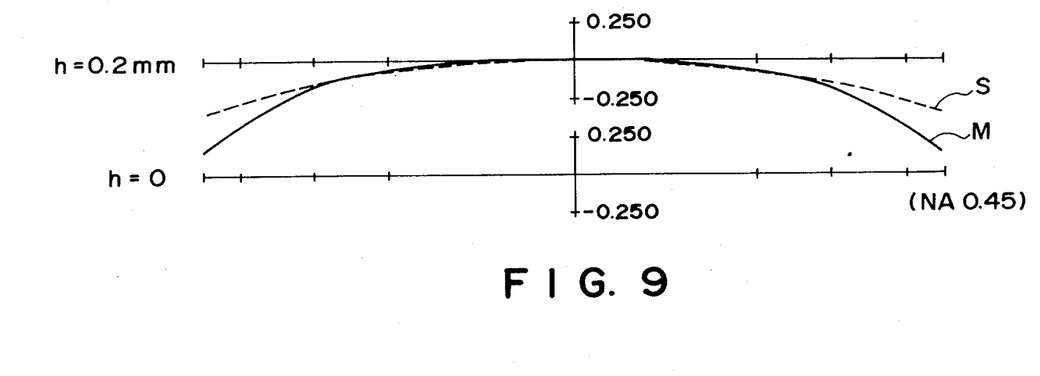
Figure 10:
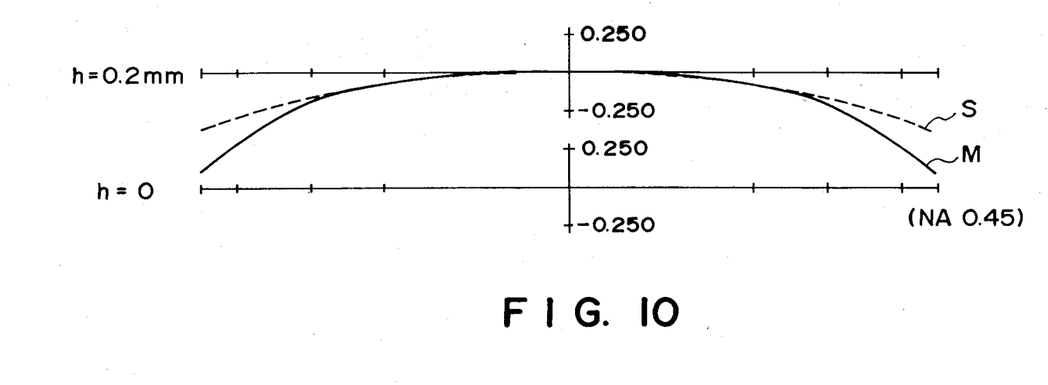
Figure 11:
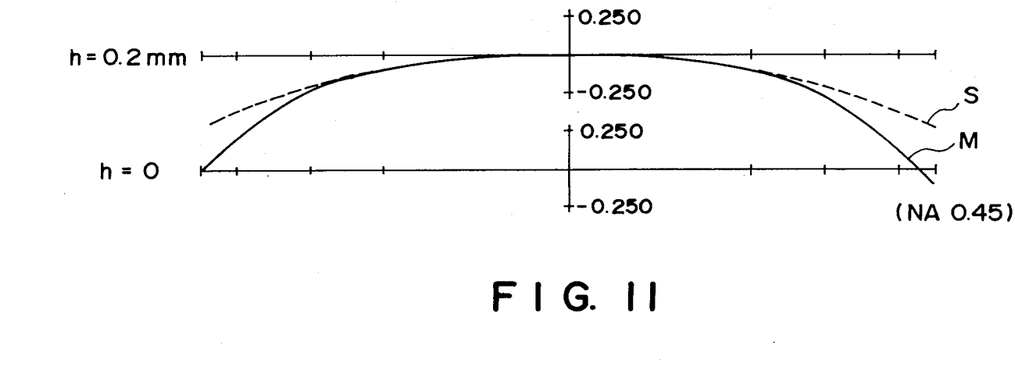

As can be seen from Table 6 a and the wave surface aberration graph of FIG. 7, the aspherical single lens according to the present embodiment satisfies the aforementioned formulas (1), (2) and (5) to (7) and therefore, has a good imaging performance and a good working distance even when it is used at a focal length f=4.2 mm and an imaging magnification $\beta = -1/4.7$. That is, it may be said that there is little or no on-axis wave surface aberration in the image plane and the off-axis aberration sufficiently satisfies the required performance, and a good imaging performance is maintained over a wide field of view.

Next, Tables 7A, 7B to 10A, 10B below show the values of the respective parameters including the lens data of seventh to tenth embodiments of the aspherical single lens according to the present invention and the values of the asphericity coefficients. Also, FIGS. 8 to 11 show the wave surface aberrations in the seventh to tenth embodiments. Accordingly, in these figures and tables, the symbols are similar in significance to those in the previous embodiment and the form of description is also similar.

TABLE 7A

| | |
|---|---|
| f = 4.2 | $\beta = -1/4.7$ |
| $\gamma_1 = 3.82454$ | $\gamma_2 = -9.11132$ |
| d = 5.4 | n = 1.78569 |
| WD = 1.710 | NA = 0.45 |
| np = 1.51 | tp = 7.5 |
| nc = 1.55 | tc = 1.2 |

TABLE 7B

| | |
|---|---|
| $K_1 = 2.67973 \times 10^{-2}$ | $K_2 = -3.81392 \times 10$ |
| $B_1 = -1.38054 \times 10^{-3}$ | $B_2 = 2.83259 \times 10^{-3}$ |
| $C_1 = -8.52670 \times 10^{-5}$ | $C_2 = -1.35006 \times 10^{-4}$ |
| $D_1 = -3.02533 \times 10^{-6}$ | $D_2 = -4.34036 \times 10^{-6}$ |
| $E_1 = -4.04551 \times 10^{-7}$ | $E_2 = 5.11091 \times 10^{-7}$ |
| $A'_1 = -1.01679 \times 10^{-4}$ | $A'_2 = 0$ |
| $B'_1 = -9.30233 \times 10^{-5}$ | $B'_2 = 0$ |
| $C'_1 = 1.74679 \times 10^{-5}$ | $C'_2 = 0$ |
| $D'_1 = -6.18567 \times 10^{-7}$ | $D'_2 = 0$ |

TABLE 8A

| | |
|---|---|
| f = 5.0 | $\beta = -1/4.43$ |
| $\gamma_1 = 4.5206$ | $\gamma_2 = -11.32656$ |
| d = 6.394 | n = 1.78569 |
| WD = 2.24282 | NA = 0.45 |
| np = 1.51 | tp = 7.5 |
| nc = 1.55 | tc = 1.2 |

TABLE 8B

| | |
|---|---|
| $K_1 = 1.7335 \times 10^{-2}$ | $K_2 = -3.90943 \times 10$ |
| $B_1 = -8.59107 \times 10^{-4}$ | $B_2 = 1.93107 \times 10^{-3}$ |
| $C_1 = -3.50121 \times 10^{-5}$ | $C_2 = -7.67225 \times 10^{-5}$ |
| $D_1 = -6.72991 \times 10^{-7}$ | $D_2 = 1.5583 \times 10^6$ |
| $E_1 = -9.42818 \times 10^{-8}$ | $E_2 = 0$ |
| $A'_1 = -4.25226 \times 10^{-3}$ | $A'_2 = 0$ |
| $B'_1 = -4.78003 \times 10^{-5}$ | $B'_2 = 0$ |
| $C'_1 = 7.35455 \times 10^{-6}$ | $C'_2 = 0$ |

TABLE 8B-continued

| | |
|---|---|
| $D'_1 = -2.89961 \times 10^{-7}$ | $D'_2 = 0$ |

TABLE 9A

| | |
|---|---|
| $f = 5.0$ | $\beta = -1/4.43$ |
| $\gamma_1 = 4.54515$ | $\gamma_2 = -11.35148$ |
| $d = 6.28$ | $n = 1.78569$ |
| $WD = 2.31481$ | $NA = 0.45$ |
| $np = 1.51$ | $tp = 7.5$ |
| $nc = 1.55$ | $tc = 1.2$ |

TABLE 9B

| | |
|---|---|
| $K_1 = 2.04507 \times 10^{-2}$ | $K_2 = -3.81903 \times 10$ |
| $B_2 = -8.52586 \times 10^{-4}$ | $B_2 = 1.62108 \times 10^{-3}$ |
| $C_1 = -3.50093 \times 10^{-5}$ | $C_2 = -5.7307 \times 10^{-5}$ |
| $D_1 = -8.01179 \times 10^{-7}$ | $D_2 = 0$ |
| $E_1 = -9.45261 \times 10^{-8}$ | $E_2 = 0$ |
| $A'_1 = -5.77339 \times 10^{-5}$ | $A'_2 = 0$ |
| $B'_1 = -4.69803 \times 10^{-5}$ | $B'_2 = 0$ |
| $C'_1 = 6.56869 \times 10^{-6}$ | $C'_2 = 0$ |
| $D'_1 = -1.84136 \times 10^{-7}$ | $D'_2 = 0$ |

TABLE 10A

| | |
|---|---|
| $f = 4.0$ | $\beta = -1/5$ |
| $\gamma_1 = 3.71637$ | $\gamma_2 = -8.30827$ |
| $d = 5.0$ | $n = 1.78569$ |
| $WD = 1.658$ | $NA = 0.45$ |
| $np = 1.51$ | $tp = 7.5$ |
| $nc = 1.55$ | $tc = 1.2$ |

TABLE 10B

| | |
|---|---|
| $K_1 = 3.0462 \times 10^{-2}$ | $K_2 = -3.52845 \times 10$ |
| $B_1 = -1.65076 \times 10^{-3}$ | $B_2 = 1.42948 \times 10^{-3}$ |
| $C_1 = -1.10832 \times 10^{-4}$ | $C_2 = -5.69589 \times 10^{-5}$ |
| $D_1 = -3.72072 \times 10^{-6}$ | $D_2 = 1.68375 \times 10^{-5}$ |
| $E_1 = 2.27700 \times 10^{-7}$ | $E_2 = -1.03794 \times 10^{-5}$ |
| $A'_1 = -4.93991 \times 10^{-5}$ | $A'_2 = 0$ |
| $B'_1 = -1.02040 \times 10^{-4}$ | $B'_2 = 0$ |
| $C'_1 = 3.17936 \times 10^{-5}$ | $C'_2 = 0$ |
| $D'_1 = -4.23954 \times 10^{-6}$ | $D'_2 = 0$ |

As described above, the aspherical single lens according to the present invention is a lens which can well accomplish the correction of aberrations over a wide field of view, i.e., the correction of spherical aberration, coma and astigmatism and moreover can secure a sufficient working distance even if the focal length of the lens is shortened, to thereby make the optical system compact.

The aspherical single lens of the present invention is particularly suitable for use in an optical head forming a finite imaging system and can provide a compact optical head of high performance comprising a single lens which could not heretofore have been provided.

The embodiments shown herein are a form of the present invention, and various lenses can be designed on the basis of the idea of the present invention.

What we claim is:

1. An aspherical single lens having:
a first surface having a radius of curvature $r_1$ in the vicinity of an optic axis facing the object side; and
a second surface having a radius of curvature $r_2$ in the vicinity of the optic axis facing the image side;
each of said first surface and said second surface having an aspherical shape in which the radius of curvature becomes gradually greater from a center to a marginal portion, said lens satisfying the following conditions:

$$-0.25 < \beta < -0.15 \qquad (1)$$

$$-0.5 < r_1/r_2 < -0.15 \qquad (2)$$

$$1.1 < (n-1)\left(\frac{1}{r_1} - \frac{1}{r_2}\right)f < 1.3 \qquad (3)$$

$$1.2 < d/f < 1.4 \qquad (4)$$

where $\beta$ is an imaging magnification of the lens, d is a thickness of the lens, n is a refractive index of the lens, and f is a focal length of the lens.

2. An aspherical single lens having:
a first surface having a radius of curvature $r_1$ in the vicinity of an optic axis facing the object side; and
a second surface having a radius of curvature $r_2$ in the vicinity of the optic axis facing the image side;
each of said first surface and said second surface having an aspherical shape in which the radius of curvature becomes gradually greater from a center to a marginal portion, said lens satisfying the following conditions:

$$-0.25 < \beta < -0.15 \qquad (1)$$

$$-0.45 < r_1/r_2 < -0.35 \qquad (2)$$

$$1.3 < d/r_1 < 1.5 \qquad (3)$$

$$1.2 < d/f < 1.3 \qquad (4)$$

where $\beta$ is an imaging magnification of the lens, d is a thickness of the lens, and f is a focal length of the lens.

3. An optical system comprising:
a semiconductor laser; and
a single lens for condensing light from said laser onto a predetermined image surface, said lens having a predetermined image magnification and having a first aspherical surface facing said laser and a second aspherical surface facing the image surface, wherein said lens satisfies the following conditions:

$$-0.5 < r_1/r_2 < -0.15 \qquad (1)$$

$$1.1 < (n-1)(1/r_1 - 1/r_2)f < 1.3, \qquad (2)$$

and $$1.2 < d/f < 1.4 \qquad (3)$$

where $r_1$ is a radius of curvature of said first surface in the vicinity of an optical axis of said lens, $r_2$ is a radius of curvature of said second surface in the vicinity of the optical axis, d is an on-axis thickness of the lens, n is a refractive index of the lens, and f is a focal length of the lens.

4. An optical system according to claim 3, wherein the imaging magnification $\beta$ of said lens satisfies $-0.25 < \beta < -0.15$.

5. An optical system comprising:
a semiconductor laser; and
a single lens for condensing light from said laser onto a predetermined image surface, said lens having a predetermined image magnification and having a first aspherical surface facing said laser and a second aspherical surface facing the image surface, wherein said lens satisfies the following conditions:

$$-0.45 < r_1/r_2 < -0.35 \tag{1}$$

$$1.3 < d/r_1 < 1.5, \tag{2}$$

and $$1.2 < d/f < 1.3 \tag{3}$$

where $r_1$ is a radius of curvature of said first surface in the vicinity of an optical axis of said lens, $r_2$ is a radius of curvature of said second surface in the vicinity of the optical axis, d is an on-axis thickness of the lens, and f is a focal length of the lens.

6. An optical system according to claim 5 wherein the imaging magnification $\beta$ of said lens satisfies $-0.25 < \beta < -0.15$.

* * * * *

UNITED STATES PATENT AND TRADEMARK OFFICE
CERTIFICATE OF CORRECTION

PATENT NO. : 4,768,867
DATED : September 6, 1988
INVENTOR(S) : SHIGEYUKI SUDA

It is certified that error appears in the above-identified patent and that said Letters Patent is hereby corrected as shown below:

In the Cover Page,

[57], line 2, "rin" should read --$r_1$ in--.

Column 1,
line 11, "-1/6" should read -- -1/6,--.

Column 3,
line 38, "and" should be deleted.

Column 4,
line 14, "(3)and" should read --(3) and--;

same line, "sperical" should read --spherical--.

Column 6,
Table 2A, "$\beta_1$ = 4.20019" should read --$\gamma_1$ = 4.20019--;
Table 3A, "F = 5.0" should read --f = 5.0--.

UNITED STATES PATENT AND TRADEMARK OFFICE
CERTIFICATE OF CORRECTION

PATENT NO. : 4,768,867
DATED : Septemmber 6, 1988
INVENTOR(S) : SHIGEYUKI SUDA

It is certified that error appears in the above-identified patent and that said Letters Patent is hereby corrected as shown below:

Column 9,

Table 9B, "$B_2 = -8.52586 \times 10^4$" should read --$B_1 = -8.52586 \times 10^{-4}$--;

line 46, "astigmatism" should read --astigmatism,--.

Signed and Sealed this

Eighteenth Day of July, 1989

Attest:

DONALD J. QUIGG

Attesting Officer

Commissioner of Patents and Trademarks